United States Patent Office 3,824,207
Patented July 16, 1974

3,824,207
MANUFACTURE OF HIGH MOLECULAR WEIGHT SYNTHETIC LINEAR POLYAMIDES
John Anthony Carter, Coytre, near Pontypool, England, assignor to ICI Fibres Limited, Pontypool, England
No Drawing. Continuation-in-part of application Ser. No. 89,017, Nov. 12, 1970, which is a continuation of application Ser. No. 676,649, Oct. 19, 1967, both now abandoned. This application Sept. 21, 1972, Ser. No. 290,921
Claims priority, application Great Britain, Nov. 9, 1966, 50,214/66
Int. Cl. C08f 45/04
U.S. Cl. 260—37 N                11 Claims

ABSTRACT OF THE DISCLOSURE

The invention comprises a method which uses a single stage continuous process to produce a pigmented high molecular weight linear polyamide. The pigment is injected into the reaction mass of monomers used to prepare the polyamide substantially at the mid-point of the reaction chamber for producing the pigmented polyamide. The process is performed at elevated pressures and temperatures.

---

The present invention which is a continuation-in-part application of U.S. patent application Ser. No. 89,017, filed Nov. 12, 1970, which is a continuation application of U.S. patent application Ser. No. 676,649, filed Oct. 19, 1967, both now abandoned, relates to the manufacture of high molecular weight synthetic linear polyamides containing pigments by the polycondensation of diammonium salts of dibasic acids or of omega-amino aliphatic carboxylic acids, and more particularly to a continuous process for carrying out said polymerization in an elongate reaction zone.

The term "polyamide" as used in this specification and its claims includes interpolyamides.

The expression "high molecular weight linear polyamides" signifies that the degree of polymerization of the polyamides is great enough for them to be melt-spun into filaments, this degree of polymerization corresponding to the elimination from the monomers of circa 90–95% of the total theoretically available water of condensation. The term "pigment" includes colourless pigments otherwise referred to as "delustrants."

The manufacture of such polyamides, particularly polyhexamethylene adipamide, for example, is commerically important. Moreover most of the manufactured polymer is put to uses which entail the incorporation therein of a delustrant. For this purpose titania is employed in proportions usually varying from about ⅓–3% depending on the nature of the textile articles to be made of the polyamide. Sometimes coloured pigments are introduced so that filaments of various shades can be directly melt-spun without any subsequent dyeing process; for example black polyamides are obtained by the incorporation of carbon black.

Processes for carrying out such polyamide polymerization in a tube or elongate reaction zone are known including the incorporation of a pigment as an aqueous dispersion as described in Examples 4 and 13 of British Patent Specification No. 924,630. The molten polymerizing mass is understood to flow along the tube as an annulus on the inner surface thereof whilst gas (steam) passes down the center, the process thus constituting a case of two phase annular flow.

The efficiency of the melt-spinning process and the properties of the resulting polyamide filaments depend however very much on the success which is achieved in maintaining the pigment particles in a state of fine dispersion. The term "fine" must be understood as indicating a sort of average fineness because nomally the dispersion is not uniform since the particles (and aggregates thereof) are present in a range of sizes. Should the dispersion become insufficiently fine, the filters employed in melt-spinning get clogged and require unduly frequent renewal. In addition the so-called covering power of the pigment decreases. Thus in the case of titania (for a given concentration) the opacity of the filament diminishes. This can readily be seen on inspection of a fabic with the naked eye, although it is not easy to assign numerical values to measure the degree of opacity.

Whilst as already mentioned, the pigment dispersion can be added to the starting materials for the polyamide polymerization, it has now been found that better dispersions of pigment in the polyamide are obtainable when the aqueous dispersion is not introduced until polymerization has commenced. The theoretical reasons are not thoroughly understood, one hypothesis being to the effect that the dispersion is sensitive to carboxyl ions the concentration of which is known to decrease during the course of the polymerization. Be this as it may, it has proved advantageous not to add the pigment dispersion until after lower oligomers have been formed with the almost complete disappearance of the original monomer. Experiments show that this state of affairs is reached when the temperature of the reaction mass has attained or nearly attained that of the wall of the reaction vessel, which may take the form of a tube or series of tubes to contain the elongate reaction zone. On the other hand the pigment dispersion must not be added too late for the following reason. The further the polymerization proceeds, and the lower the pressure falls in the elongate reaction zone, the more the polyamide tends to freeze if a fall in the temperature is caused by the introduction of cold water (pigment dispersion). The tendency to freeze is however less where relatively lower degrees of polymerization, corresponding to higher pressures, are present. In practice it has been found satisfactory to introduce the dispersion at any point in the elongate reaction zone (1) *after* the reaction mass has attained the temperature of the vessel wall but (2) *before* the pressure has fallen to a value less than 7 atmospheres above the pressure at the end of the reaction zone. More specifically the dispersion should be introduced into the elongate reaction zone at an upstream point approaching the middle of its length and still more preferably at a point from the inlet about 45/100 to 46/100 of the total length of the reaction zone.

Accordingly the invention consists of a continuous process for the manufacture of pigmented high molecular weight linear polyamides by the condensation polymerization of one or more monomers selected from the group comprising a diammonium salt of a diamine

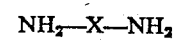

with a dibasic acid HOOC—Y—COOH, or an amino acid $NH_2$—Z—COOH wherein X, Y and Z denote chains of methylene groups, X and Y together containing at least 6 methylene groups and Z at least 3, each methylene chain containing, not joined directly to an amino group, 0, 1 or 2 meta- or paraphenylene groups, and X, Y and Z optionally bearing alkyl or aryl substituents and optionally containing —O— links in the chain, providing the groupings —O—O—, —O—$CH_2$—N— and

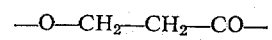

be absent, comprising pumping an aqueous solution of said monomer or monomers through an elongate reaction zone heated to polymerization temperatures wherein the reaction mass flows in two phases from a pressure of at least 14 atmospheres at the inlet to the zone to a pressure not over 1 atmosphere at the outlet to the zone, and injecting a dispersion of the pigment into the elongate reaction zone at an upstream point approaching the middle of its length where the temperature of the reaction mass is less than 5° C. below that of the wall of the vessel containing the elongate reaction zone and the pressure is not less than 7 atmospheres above the pressure at the outlet to the reaction zone.

The monomers, mixtures of which can be used, should be chosen so as to yield a polyamide or interpolyamide which melts, if necessary in admixture with a plasticizer, below 350° C. and preferably below 300° C. As is well known interpolyamides usually melt at lower temperatures than the consituent polyamides. Indeed a minor proportion of a second monomer is frequently termed an internal plasticizer.

Examples of suitable monomers for carrying out the process of the present invention are:

hexamethylene diammonium adipate
hexamethylene diammonium sebacate
octamethylene diammonium adipate
decamethylene diammonium adipate
pentamethylene diammonium sebacate
dodecamethylene diammonium adipate
omega-aminocaproic acid
omega-aminoundecanoic acid
hexamethylene diammonium azelaate
hexamethylene diammonium suberate
p-(gamma-amino-n-propyl) phenoxyacetic acid
1-p-(gamma-carboxy-n-propyl) phenyl-2-aminoethane also the diammonium salts from the following pairs of amines and acids:

| Amine | Acid |
|---|---|
| m-Xylylene diamine | Adipic acid. |
| Hexamethylene diamine | Isophthalic acid. |
| 2,5 di-(beta-aminoethyl)-p-xylene | Pimelic acid. |
| 2,5 di-(beta-aminoethyl)durene | 1,16-hexadecane dicarboxylic acid. |
| m-Di-(beta-aminoethyl)benzene | Adipic acid. |
| Di-(aminomethyl)mesitylene | Azelaic acid. |
| Dodecamethylene diamine | Terephthalic acid. |
| Decamethylene diamine | p-Di-(beta-carboxyethyl) benzene. |

The following mixtures of monomers yield, for example, interpolyamides:

(1) hexamethylene diammonium adipate and omega-amino caproic acid.
(2) hexamethylene diammonium adipate and hexamethylene diammonium sebacate.
(3) hexamethylene diammonium adipate and hexamethylene diammonium isophthalate.
(4) dodecamethylene diammonium suberate and dodecamethylene diammonium laurate.
(5) dodecamethylene diammonium terephthalate and hexamethylene diammonium terephthalate.
(6) the salts from hexamethylene diamine, p-di-(beta-carboxyethyl) benzene and beta-(p-carboxymethyl-phenyl) propionic acid.
(7) the salts from hexamethylene diamine, adipic acid and 1,4-diphenyladipic acid.

Small amounts of the order of a few percent of other polyamide-forming monomers, e.g. N,N$^1$-piperazine-di-(gamma)-n-propylammonium adipate or hexamethylene diammonium fluorene-Z-sodio-sulphonate-bis - 9,9-propionate, may also be employed in conjunction with the above monomers. There may also be added to the reaction mixture bifunctional or monofunctional compounds in small quantity, notably monoamines or monobasic acids, e.g. acetic acid in order to prevent polymerisation proceeding beyond the desired degree at elevated temperatures, for example, when the polyamide is held molten for the purpose of melt-spinning. Such monofunctional compounds are known as viscosity stabilisers. Other adjuvants may also be added, for instance, dyes, dyestuff formers, heat stabilisers, light stabilisers, and polyamide and other resins.

It is advisable to include with the aqueous monomer salt starting material a little of the amine constituent of the salt e.g. hexamethylene diamine, in order to compensate for the loss of amine in the gas phase (steam) which tends to occur. This is one of the reasons for stipulating a minimum pressure of 14 atmospheres (based upon experiments) at the inlet to the elongate reaction zone. Another reason is that with lower pressures the process is apt to run unsteadily yielding unsatisfactory results.

If desired, the gas phase which is mainly steam, can be replaced to a greater or less extent by an inert gas, for instance by injecting nitrogen, but the inert gas must be free of oxygen, since very small quantities thereof degrade the polymer.

Suitable plasticisers, which should be devoid of halogen and ester groups, are phenols, medium and high boiling glycols and sulphonamides, for instance:

1,12-di-(p-hydroxyphenyl)-octadecane
hexamethylene glycol
2-ethylhexane diol-1,3
N-ethyl-o-toluene sulphonamide
N-butyl-p-toluene sulphonamide
N-phenylcyclohexane sulphonamide For making a given polyamide it is found in practice that a temperature at least 10° C. above the melting point of the polyamide can be regarded as a suitable polymerisation temperature i.e. a temperature at which amide formation proceeds at a useful rate, provided it be not too high otherwise degradation of the polyamide is likely to occur. The temperature of the polymerising material is preferably not allowed to fall as it passes through the elongate reaction zone. It is convenient that the whole zone be at one uniform temperature. The temperature is advantageously from 275° C. to 300° C.

The mixture of monomer and water should constitute a strong solution or suspension and contains preferably at least 40% by weight of monomer. Furthermore suspensions of monomer are desirably heated so as to bring about solution; in any case sufficient water should be present to dissolve the monomer at polymerisation temperatures. Of course all materials entering the elongate reaction zone should be as free as possible of impurities which lead to undesirable deposits forming on the inside walls of said zone.

The elongate reaction zone, conveniently contained by a tube, may possess any feasible shape; e.g. a helix positioned vertically or horizontally. The vertical helix can be traversed by the polymerising mass in an upward or downward direction. The material of which the tube is constructed is preferably one not subject to corrosion by the polymerising mass and may be, for instance, stainless steel. The tube must be capable of withstanding a high pressure which may, for example reach 28 atmospheres at the inlet end and in some cases considerably higher values.

The invention includes melt-spinning the above polyamides into filaments, films, ribbons and like lengthy extruded objects and the said objects when so melt-spun. In such case the viscosity of the melted polymer prior to extrusion is of importance and may be measured by, for instance, the pressure drop across an orifice in the polymer path.

The pigment e.g. titania is injected, i.e. pumped in under pressure in the form of a fine dispersion, preferably aqueous. The dispersion is conventionally made by milling the titania, say, with water, advantageously in the presence of ¼–½% sodium hexametaphosphate or sodium pyrophosphate. To minimise abrasion and wear, the piston and other parts of the pump used for the aqueous dispersion or slurry of the pigment may be made of polyhexamethylene adipamide (nylon) or other plastic resistant to abrasion. The concentration of the pigment dispersion should be adjusted to e.g. 1–10% so that the desired rate of injection corresponds to a conveniently pumpable volume rate. Thus difficulties may be experienced in accurately pumping the dispersion at a lower rate than 10 cc. per minute, unless pumps specially designed for the purpose are employed. For instance a pump of refined construction, unable itself to handle the pigment dispersion, but capable of pumping water very accurately, can be employed to pass water into a suitable pump where it actuates a floating piston, on the other side of which is the pigment dispersion. The latter is thus impelled at the same accurate volume rate as the water. The water pump may consist of a diaphragm pump or may comprise a reciprocating plunger in place of the diaphragm. Instead of the floating piston pump, the flexible chamber pump described in British patent specification No. 835,920 can be used.

Examples of pigments besides titania and carbon black which may be incorporated in the polyamide are: barium sulphate, zinc titanate, zinc oxide, zinc sulphide, lithopone, zirconium dioxide, calcium sulphate, copper phthalocyanine, chromium oxide, lead chromate, magnesium oxide, iron oxide and cadmium sulphide.

Such pigments may, if desirable, be used as mixtures one with another. Furthermore other insoluble compounds may conveniently be incorporated in the pigment dispersion, as may other compounds soluble in the dispersing medium. Such other compounds may, if necessary, be pre-coated onto the insoluble particles.

Other dispersing agents may be used in the dispersion and indeed, the dispersing agent may have to be chosen in accordance with the materials comprising the dispersion as well as taking into account any effects in the finally produced polymer.

The following Examples are intended to illustrate not limit the invention. The parts and percentages are calculated by weight.

EXAMPLE 1

The elongate reaction zone is contained in a coiled steel tube jacketed with the vapours of the eutectic mixture of diphenyl and diphenyloxide which condense at 290° C. The tube comprises 203 metres of internal diameter 17 mm. starting from the inlet followed by 70 metres of internal diameter 57 mm.

An aqueous solution containing 47% of hexamethylene diammonium adipate, 0.24% of hexamethylene diamine and 0.0028% of acetic acid is pumped at a rate of 3.28 kg./min. into the inlet of the above tube where the pressure is 28.6 atmospheres and the temperature of the reaction mass 289° C. Titania (anatase form) is milled with water and the resulting slurry diluted to a 10% dispersion. The latter is injected at a rate of 272 gm./min. into the above tube at a point 122 metres from the inlet where the pressure is 23 atmospheres.

The polyhexamethylene adipamide obtained is melt-spun into delustred filaments in which the titania is finely dispersed.

EXAMPLE 2

Example 1 is repeated with the following reagents and conditions substituted for the ones given:

Monomer solution: 47% hexamethylene diammonium adipate, 0.026% hexamethylene diamine, 0.0103% acetic acid.
Rate of pumping: 2.96 kg./min.
Pigment dispersion: 10% aqueous carbon black.
Rate of injection: 245 gms./min.

The polyamide is melt-spun into a black yarn of 20 filaments which is drawn down to 70 denier.

EXAMPLE 3

A tube of austenitic steel comprising (starting with the inlet end) 137 metres of internal diameter 14 mm. followed by 52 metres of internal diameter 45 mm. is made into a coil. The tube is maintained at 290° C.

An aqueous monomer solution containing 47% hexamethylene diammonium adipate and 0.445 hexamethylene diamine is pumped into the inlet end of the above tube (pressure 30.6 atmospheres) at a rate of 1.64 kgm./min. 82 metres down the tube where the pressure is 29 atmospheres and the temperature of the reaction mass 289° C. there is injected at a rate of 134 gms./min. by means of a pump with a nylon plunger a titania dispersion made as follows:

Titania dispersion 25.4 kgm. of finely divided titania (anatase form) together with 250 gm. finely divided commercial manganese pyrophosphate are added to a solution of 224 gm. sodium pyrophosphate decahydrate in 38.1 kgm. filtered deionised water. The dispersion is milled until an average particle size of 0.28 microns has been attained, and then diluted by adding it to a solution of 224 gm. sodium pyrophosphate decahydrate in 190.5 kgm. of filtered deionised water. This diluted dispersion is injected into the coil.

The resulting polyamide is melt-spun into a yarn of 13 filaments having a total denier of 130. The titania delustrant is well dispersed in the filaments.

EXAMPLE 4

A narrow coiled polymerisation tube of stainless steel comprising 73 metres of internal diameter 8 mm. followed by 32 metres of internal diameter 25.4 mm. is maintained at 291° C. The outlet end of the tube leads into a cylindrical reservoir 30 cms. in diameter and 60 cms. high with a conical bottom enclosing an angle of 80° carrying at its apex a pump for forwarding the polyamide which collects as a pool in the reservoir, to spinnerets, where it is melt-spun into filaments.

Two different solutions of monomer are pumped into the inlet, where the pressure is 23 atmospheres, namely:

Solution No. 1:
  44.7% hexamethylene diammonium adipate
  0.3% hexamethylene diamine
  55.0% water
Solution No. 2:
  38.8% hexamethylene diammonium adipate
  0.3% hexamethylene diamine
  60.9% water The output of polyamide is regulated by alternating the monomer supply between these solutions. The alternation is effected by conventional electronic means actuated by the intermittent interruption (when the level of polyamide rises in the reservoir) of a collimated beam of gamma rays from a caesium 137 source. When the beam passes, Solution No. 1 is pumped at 313.5 cc./min.; when the beam is interrupted by the polymer in the vessel Solution No. 2 is pumped at 290 cc./min. An aqueous titania dispersion, prepared as in Example 3 is injected into the coil at a point 48.7 metres from the inlet and the pressure 21 atmospheres. When Solution No. 1 is being pumped, the dispersion is injected by means under electronic control at a rate of 26.5 gm./min.; when Solution No. 2 is being pumped the rate of injection is 21 gm./min. The resulting polyamide is melt-spun into 13-filament yarn, total denier 130, in which the titania is finely dispersed.

EXAMPLE 5

Example 4 is repeated except that the titania dispersion is injected at a point 24.3 metres from the inlet, where the temperature of the reaction mass is 290° C., and the pressure 17 atmospheres, and the alternation of the solutions of monomer is controlled by an electrically conducting probe which makes contact with the surface of the molten polyamide in the reservoir (so completing an electrical circuit) when the pool rises to the desired level.

EXAMPLE 6

A coiled steel tube comprising (starting with the inlet end) 45.7 metres of internal diameter 6.3 mm. followed by 15.2 metres of internal diameter 22.2 mm. is maintained at 290° C. An aqueous monomer solution containing 47% of hexamethylene diammonium adipate, 0.42% of hexamethylene diamine and 0.028% of acetic acid is pumped into the inlet of the tube where the pressure is 22 atmospheres at a rate of 155 gm./min. A 5% aqueous dispersion of titania is injected into the tube 29.8 metres from the inlet where the reaction mass is at 289° C., against a pressure of 14 atmospheres at a rate of 25 gms./min. A well delustred polyamide results.

EXAMPLE 7

Example 6 is repeated except that the titania is replaced by channel black, and the polyamide is melt-spun into filaments. The latter possess a lustrous dense black colour.

EXAMPLE 8

Example 6 is repeated except that the channel black is replaced by cadmium sulphide, yellow filaments are obtained.

EXAMPLE 9

Example 6 is repeated save that the monomer solution is replaced by an aqueous solution containing 40% omegaaminocaproic acid, and 0.1% acetic acid. A similar delustred polyamide is obtained.

What is claimed is:

1. In a single stage continuous process for the manufacture of pigmented high molecular weight linear polyamides by the condensation polymerization of one or more monomers selected from the group comprising a diammonium salt of a diamine NH$_2$—X—NH$_2$ with a dibasic acid HOOC—Y—COOH, or an amino acid

NH$_2$—Z—COOH wherein X, Y and Z denote chains of methylene groups, X and Y together containing at least 6 methylene groups and Z at least 3, each methylene chain containing, not joined directly to an amino group, 0, 1 or 2 meta- or para-phenylene groups, and X, Y and Z optionally bearing alkyl or aryl substituents and optionally containing —O— links in the chain, providing the groupings

,

—O—CH$_2$—N— and 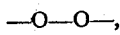—CH$_2$—CO— be absent, which process includes pumping an aqueous solution of said monomer or monomers through an elongate reaction zone heated to the polymerization temperature of said monomer or monomers, said temperature being at least 10° C. above the melting point of the corresponding polyamide and sufficient to cause polyamide formation to proceed at a useful rate, but insufficient to cause polyamide degradation, wherein the reaction mass flows in two phases from a pressure of at least 14 atmospheres at the inlet to the zone to a pressure not over 1 atmosphere at the outlet to the zone, wherein the improvement comprises injecting a dispersion of the pigment into the elongate reaction zone at an upstream point substantially at the mid-point of its length where the temperature of the reaction mass is less than 5° C. below that of the wall of the vessel containing the elongate reaction zone and the pressure is not less than 7 atmospheres above the pressure at the outlet to the reaction zone.

2. A process for the manufacture of pigmented high molecular weight linear polyamides as claimed in claim 1 wherein the reaction zone inlet pressure is between 20 and 50 atmospheres and the pressure at the dispersion injection point is below the inlet pressure and between 10 and 40 atmospheres.

3. A process for the manufacture of pigmented high molecular weight linear polyamides as claimed in claim 1 wherein the polyamide forming components comprises the salt of hexamethylene diamine and adipic acid.

4. A process for the manufacture of pigmented high molecular weight linear polyamides as claimed in claim 1 wherein the pigment dispersion is aqueous.

5. A process for the manufacture of pigmented high molecular weight linear polyamides as claimed in claim 1 wherein the pigment comprises titanium dioxide.

6. A process for the manufacture of pigmented high molecular weight linear polyamides as claimed in claim 1 wherein the pigment comprises carbon black.

7. The process of claim 1 wherein the elongated reaction zone is heated to a temperature of 275 to 300° C.

8. The process of claim 1 wherein the amount of pigment dispersion injected into said reaction zone is controlled proportionally to the flow of monomer into said reaction zone.

9. A process for producing in a single stage a pigmented high molecular weight linear condensation polyamide in a continuous elongated tubular reaction zone, comprising applying heat to said elongated tubular reaction zone to maintain a polymerization temperature of about 275 to 300° C., pumping an aqueous solution of polyamide-forming condensation reactant into said elongated tubular reaction zone under a pressure of at least 14 atmospheres at the inlet to said zone to a pressure not over 1 atmosphere at the outlet to said zone to produce a two-phase annular flow, injecting a dispersion of pigment into said elongated reaction zone at an upstream point substantially at the mid-point of its length where the temperature of the reaction mass is less than 5° C. below that of the applied heat and the pressure is not less than 7 atmospheres above the pressure at the outlet to the reaction zone and controlling the amount of pigment dispersion injected into said reaction zone proportionally to the flow of reactant into said reaction zone.

10. The process of claim 10 wherein the pigment injection is periodically at least two different rates during the continuous polymerization.

11. A process for the manufacture of pigmented high molecular weight linear polyamides by the condensation polymerization of one or more monomers selected from the group comprising a diammonium salt of a diamine NH$_2$—X—NH$_2$ with a dibasic acid HOOC—Y—COOH, or an amino acid NH$_2$—Z—COOH wherein X, Y and Z denote chains of methylene groups, X and Y together containing at least 6 methylene groups and Z at least 3, each methylene chain containing, not joined directly to an amino group, 0, 1 or 2 meta- or para-phenylene groups, and X, Y and Z optionally bearing alkyl or aryl substituents and optionally containing —O— links in the chain, providing the groupings —O—O—, —O—CH$_2$—N— and —O—CH$_2$CH$_2$—CO— be absent, which process comprises pumping an aqueous solution of said monomer or monomers through an elongate reaction zone heated to polymerization temperatures wherein the reaction mass flows in two phases from a pressure of at least 14 atmospheres at the inlet to the zone to a pressure not over 1 atmosphere at the outlet to the zone, wherein the improvement consists in that there is injected a dispersion of the pigment into the elongate reaction zone at an upstream point substantially at the mid-point of its length where the temperature of the reaction mass is less than 5° C. below that of the wall of the vessel containing the elongate reaction zone and the pressure is not less than 7 atmospheres above the pressure at the outlet to the reaction zone.

References Cited

UNITED STATES PATENTS

| | | | |
|---|---|---|---|
| 3,193,535 | 7/1965 | Carter | 260—78 |
| 2,689,839 | 9/1954 | Heckert | 260—37 |
| 3,375,219 | 3/1968 | Robb | 260—41 |

FOREIGN PATENTS 924,630   4/1963   England.

THEODORE, MORRIS, Primary Examiner